United States Patent
VanBlon et al.

(10) Patent No.: US 10,896,287 B2
(45) Date of Patent: Jan. 19, 2021

(54) IDENTIFYING AND MODIFYING SPECIFIC USER INPUT

(71) Applicant: Lenovo (Singapore) Pte. Ltd., Singapore (SG)

(72) Inventors: Russell Speight VanBlon, Raleigh, NC (US); Jason Peter Sallinger, Raleigh, NC (US); Joshua Neil Novak, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 110 days.

(21) Appl. No.: 14/857,438

(22) Filed: Sep. 17, 2015

(65) Prior Publication Data
US 2017/0083499 A1    Mar. 23, 2017

(51) Int. Cl.
G06F 40/174    (2020.01)
G06F 3/0488    (2013.01)
G06K 9/72    (2006.01)
G06F 40/253    (2020.01)

(52) U.S. Cl.
CPC ........ *G06F 40/174* (2020.01); *G06F 3/04883* (2013.01); *G06F 3/04886* (2013.01); *G06F 40/253* (2020.01); *G06K 9/726* (2013.01); G06K 2209/01 (2013.01)

(58) Field of Classification Search
CPC ..... G06K 9/222; G06F 40/174; G06F 40/253; G06F 3/04883
USPC ........................................................ 715/268
See application file for complete search history.

(56) References Cited

U.S. PATENT DOCUMENTS

| | | | | |
|---|---|---|---|---|
| 6,192,381 | B1* | 2/2001 | Stiegemeier | G06F 17/211 715/210 |
| 9,256,795 | B1* | 2/2016 | Gray | G06K 9/6857 |
| 2006/0045322 | A1* | 3/2006 | Clarke | G06K 9/186 382/137 |
| 2008/0181501 | A1* | 7/2008 | Faraboschi | G06F 40/174 382/179 |
| 2014/0245120 | A1* | 8/2014 | Schwartz | G06K 9/00402 715/226 |
| 2017/0083499 | A1* | 3/2017 | VanBlon | G06K 9/726 |

OTHER PUBLICATIONS

"How to remove multiple extra spaces between words in Word"; ExtendOffice; <http://www.extendoffice.com/product/kutools-for-word/word-remove-extra-spaces-between-words.html >; Published Jul. 21, 2013.*

"How to Extract Email Addresses from PDF Documents"; Damon Taylor; <https://peakmarketingsystems.com/how-to-extract-email-addresses-from-pdf-documents/>; published Aug. 28, 2014.*

(Continued)

*Primary Examiner* — Stephen S Hong
*Assistant Examiner* — Broderick C Anderson
(74) *Attorney, Agent, or Firm* — Ference & Associates LLC

(57) ABSTRACT

One embodiment provides a method, including: receiving, on a touch input device, user input; identifying, using a processor, syntax in the user input; modifying, based on the identified syntax, the user input; and inserting, using a processor, the modified user input into a data field. Other aspects are described and claimed.

20 Claims, 3 Drawing Sheets

(56) References Cited

OTHER PUBLICATIONS

"Clean up Incorrectly Formatted Phone Numbers using Excel"; Chandoo.org; <http://chandoo.org/wp/2008/09/30/clean-up-incorrectly-formatted-phone-numbers-using-excel/>; Published Sep. 30, 2008.*
Agarwal, A., et al. "Detection of Courtesy Amount Block on Bank Checks." Proceedings of 3rd International Conference on Document Analysis and Recognition, doi:10.1109/icdar.1995.602011. (Year: 1995).*
Palacios, Rafael, and Amar Gupta. "A System for Processing Handwritten Bank Checks Automatically." SSRN Electronic Journal, 2002, doi:10.2139/ssrn.302874. (Year: 2002).*

\* cited by examiner

IDENTIFYING AND MODIFYING SPECIFIC USER INPUT

BACKGROUND

Devices such as desktops, laptops, tablet computing devices, mobile phones or smart phones, e-readers, and the like provide users with convenient functionality. Users may input text (whether via key inputs or other modes, e.g., handwriting inputs converted to text) into a communication or like application using an input component (e.g., a soft (on-screen keyboard (OSK)), a mechanical or physical keyboard, etc.).

In some devices (e.g., tablet computing devices) the user relies primarily on a touch screen or "soft" keyboard (OSK), which may be used to provide key strokes. In some devices, an input method editor (IME) may be used to interpret handwritten ink strokes as input characters in addition to a more conventional soft keyboard. In still other devices (e.g., tablet with detachable keyboard, laptop computer, etc.) a pen or stylus may also be utilized to interface with the device, e.g., in connection with a digitizer or touch screen responsive to pen or touch input, even though other input modes are available (e.g., physical keyboard).

BRIEF SUMMARY

In summary, one aspect provides a method, comprising: receiving, on a touch input device, user input; indentifying, using a processor, syntax in the user input; modifying, based on the identified syntax, the user input; and inserting, using a processor, the modified user input into a data field.

Another aspect provides an information handling device, comprising: a processor; a touch input device operatively coupled to the processor; and a memory device that stores instructions executable by the processor to: receive, on the touch input device, user input; identify, using a processor, syntax of the user input; modify, based on the identified syntax, the user input; and insert, using a processor, the modified user input into a data field.

A further aspect provides a product, comprising: a storage device having code stored therewith, the code being executable by a processor and comprising: code that receives, on a touch input device, user input; code that identifies syntax in the user input; code that modifies, based on the identified syntax, the user input; and code that inserts the modified user input into a data field.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
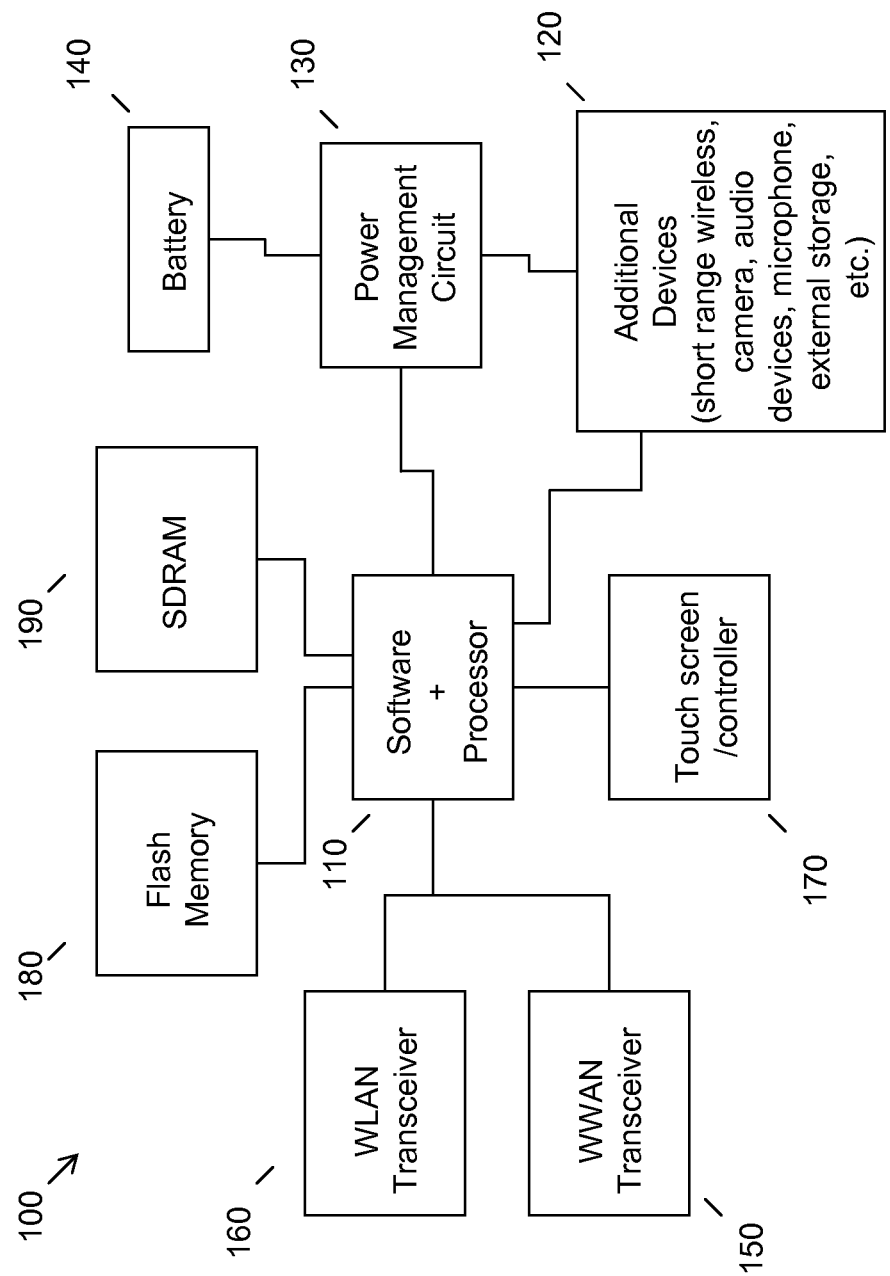
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Due to the ever expanding uses for personal electronic devices, users may be entering a wide variety of text and characters. User input may at times be specific in nature (e.g., website address, zip code, phone number, contact name, etc.). Automatically determining the type of input a user is attempting to enter and autocorrecting that input to the proper format would greatly increase the usability of a user device. One of the main impediments of textual input is user error. Additionally, current spelling, grammar, and syntax checking systems will regularly insert erroneous spaces into user input. For example, if a user misspells a word, current solutions will suggest the correct word via a prompt box. If a user selects one of the suggested words, typically a space is inserted after the selection.

When a user is imputing text into an existing data field (e.g., a web search bar, data in a PDF, data field in a website, address/subject/body of an email. etc.) it is even more important to ensure that the correct text format is adhered to. As an additional example, a user may be entering a web address into a browser address/navigation bar during which, they are likely to use a period (e.g., following www and prior to com, edu, gov, etc.). This will typically cause current auto-correction software to insert a space following the period because it assumes it is a normal sentence and thus follows basic grammar rules. Thus, a solution is needed that can recognize not only that the user is entering input into a particular data field type, but also that the user input matches a known or predetermined pattern or grammatical syntax. Once the characteristic is determined, based on the aforementioned factors, the user input is modified accordingly.

The technical issue of entering data can be even more complicated when the user is inputting using a method other than a standard ASCII input device (e.g., a physical keyboard, onscreen keyboard, etc.) For example, if user input is received in the form of handwriting input. Generally, the process of translating touch screen ink input into machine text is done using an optical character recognition (OCR) engine. However, this process can cause spaces to be inserted between what a user may intend to be a continuous string of characters (e.g., email addresses, a uniform resource locator (URL), etc.).

Therefore, an embodiment may identify email addresses, URLs, or the like, within a string of characters, regardless of input type. Moreover, regardless of possible errors during the process (e.g., improper space recognition), an embodiment will concatenate the characters which result in a specific address. Additionally, an embodiment may also identify multiple addresses in string of characters, and group only the addresses without spaces.

Accordingly, an embodiment provides a method of receiving, using an input device (e.g., physical keyboard, onscreen keyboard (OSK), touch surface, pen, etc.), user input (e.g., key presses, handwriting input, voice input, etc.). The input is then processed to identify particular characteristics of the user input (e.g., grammatical structure, spacing patterns, syntax, etc.). The user input is then modified based on these detected characteristics to be better formatted to the needs of the user and the data field being populated. Finally, an embodiment will insert the modified user input into the data field in the correctly modified syntax.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
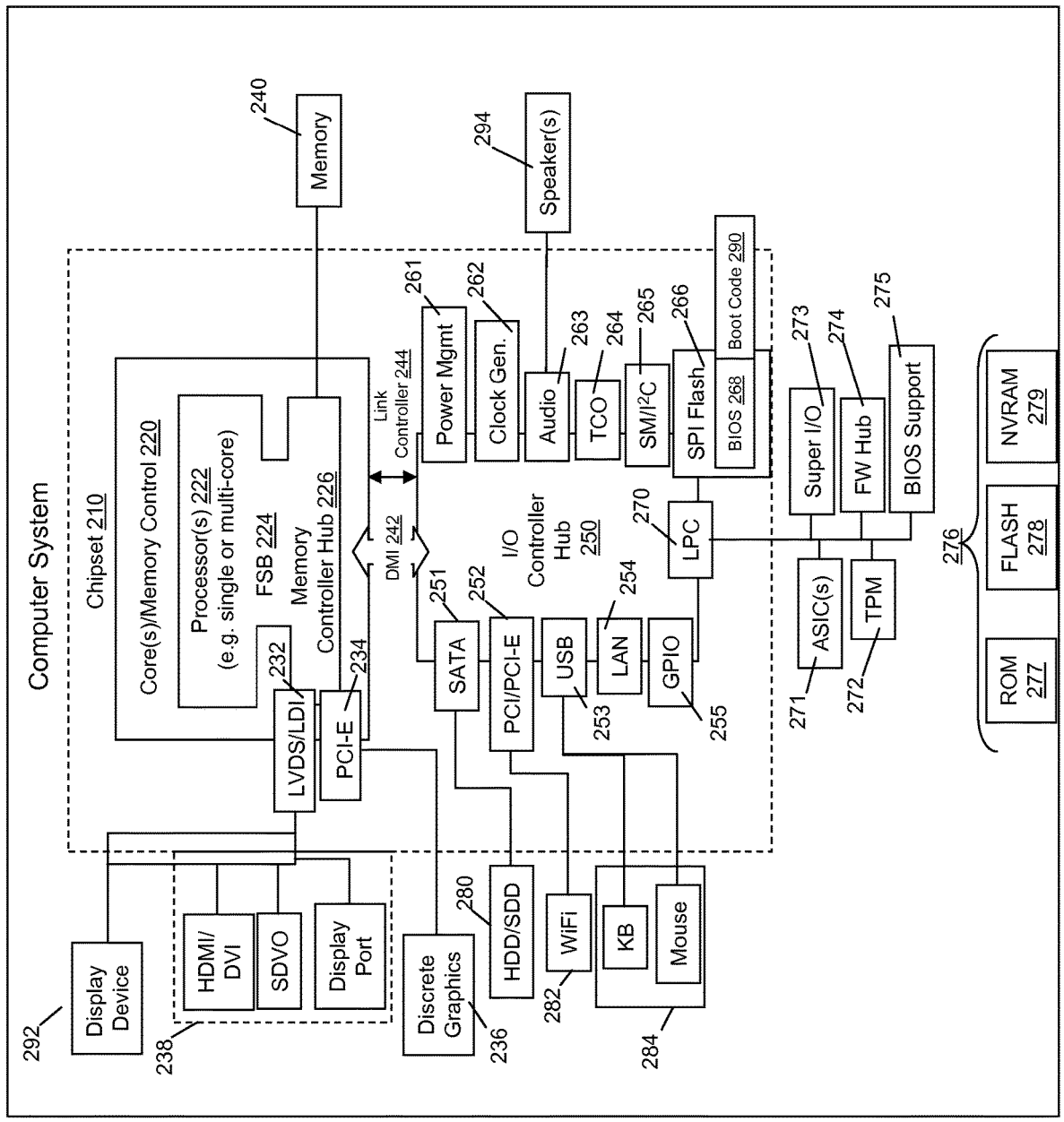
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to enter text of various types and formats (e.g., contact info, web addresses, phone numbers, etc.) For example, the circuitry outlined in FIG. 1 may be implemented in a tablet or smart phone embodiment, whereas the circuitry outlined in FIG. 2 may be implemented in a personal computer embodiment.

Figure 3:
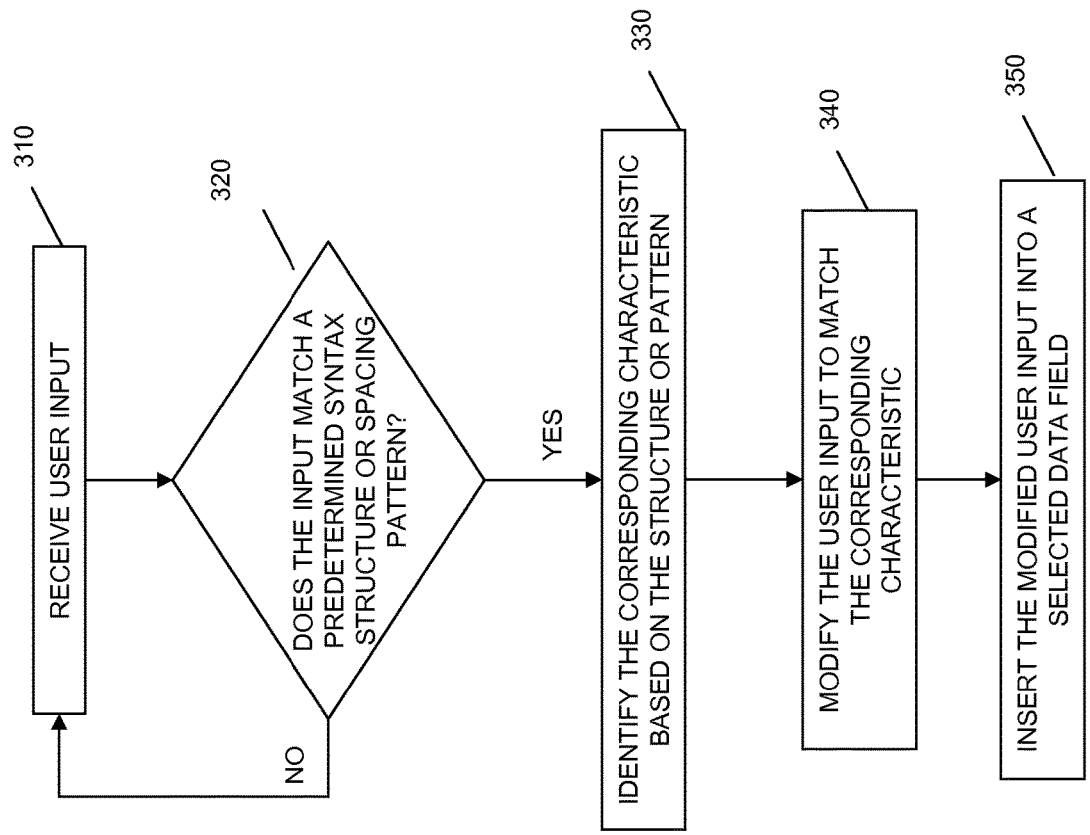
FIG. 3 illustrates an example method of identifying and modifying specific user input.

Referring now to FIG. 3, an embodiment first receives a user input at 310. The user input can be received through various ways and in various formats. For example, a user may input information using a physical keyboard, on screen keyboard (OSK), pen device, voice recognition, or any type of text entry interface. In a further embodiment, if the user input is in a format other than machine text, (e.g., handwriting, voice, etc.) a recognition engine may be required to determine the equivalent machine text. For example, if a user enters touch input in the form of handwriting input (e.g., using a pen, stylus, finger, or the like) an optical character recognition (OCR) engine process the input to convert the non-machine text user input into machine text usable by an application.

In an additional embodiment, prior to entry of the user input, a destination may be selected (e.g., a data field) as the desired destination of the user input. For example, a user, using an input device (e.g., mouse, touch screen, etc.), select an editable form field in a Portable Document Formant (PDF), a navigation bar of a browser, an address field of an email or text message, etc. as the destination data field. Based on this selection, it is determined that the user desires the textual data received or derived from the user input to be entered into the selected data field.

Additionally or alternatively, an embodiment may be able to determine the desired data field on the fly (in real time) by detecting a location of user input and determining the desired data field based on that location. By way of example, one embodiment may receive user input comprising textual information using a stylus or pen device, wherein the user simply writes directly over the desired data field without previously selected it. An embodiment may then determine based on the proximity to the user's input location, which data field the user intends to populate.

Another embodiment may also take into account the type of user input (i.e., if the user input matches a predetermined format e.g., a phone number) when determining the desired data field. For example, if a user enters handwriting input in the form of a phone number, in a location that is equidistant from a data field designed for an address and a data field designed for a phone number, an embodiment may select the phone number data field based on the determination made regarding the input type. This allows an embodiment to achieve greater accuracy.

Once the user input is received at 310, an embodiment determines if the user input matches a predetermined syntax at 320. The predetermined syntax structure may be based on a lexicon, or a plurality of lexicons. Additionally, these lexicons may be for various languages and slang. For example, if a user was entering their name, and appended "sr" at the end it could be determined that "sr" was intended to represent "Sr." as it was following the user's name, and typical syntax regarding a name suffix. A further embodiment may determine that the identified syntax was an address (e.g., uniform resource locator (URL), email address, physical address, phone number, etc.) and thus format the received input as described herein.

Additionally, if a user were to enter text that contained specific symbols (e.g., @ "at", # "hash tag", etc.) a syntaxical structure associated with those symbols may be identified. For example, if a user entered an email address (e.g., "examiner101 @ USPTO .gov"), an embodiment may determine, based on the @ symbol alone or in combination with other known syntax (e.g., .gov) that the user input is an email address. It would be understood by one skilled in the art that this is a non-limiting example, and that any grammatical syntax may be used to determine if the user input matched a predetermined syntaxical structure at 320. However, if it is not determined that a match exists at 320, an embodiment resets back to 310 and begins accepting user input again.

Additionally, an embodiment may receive the input at 310, and determine if the user input matches a predetermined spacing pattern at 320. The predetermined spacing may be based on one or more white space characters (spaces). By way of example, a user may enter handwriting input, and an embodiment determined through the utilization of OCR that the user has entered a series of number groups separated by spaces. If it is determined that the spacing pattern matches a known pattern (e.g., a phone number (xxx xxx xxxx), a social security number (xxx xx xxxx), etc.) an embodiment may modify (i.e., reformat) the user input to more accurately display the input in the proper syntax/ pattern (e.g., inserting hyphens in a phone number series (xxx-xxx-xxxx). Again, if it is not determined that a match exists at 320, an embodiment resets back to 310 and begins accepting user input again.

It should be clear to those skilled in the art, that the above are illustrative non-limiting examples only. Each method of matching (e.g., grammatical and spacing) may be carried out on any type of user input (e.g., physical keyboard, OSK, touch, pen, etc.). Once a determination has been made that a match exists, an embodiment identifies the corresponding characteristic (e.g., that the input is a phone number or website) based on the matching at 330.

Additionally or alternatively, the identified characteristic may be based on meta-data associated with a selected data field. As discussed herein, selection of the data field can happen at various stages of the user input. However, regardless of the time frame of the determination, meta-data related to the data field may be utilized to identify the input type being received at 310. For example, if a user selects or writes over a navigation bar in a web browser, an embodiment may assume that the user is intending to enter a web address. An additional example embodiment may be the detection of a user selection of a recipient box of an email, wherein the embodiment would anticipate receiving an email address comprising each component (e.g., address (username), '@' symbol, mail server domain, top level domain (TLD), and the like) and modify them accordingly.

In a further embodiment, the identified characteristics can be combined. For example, if user input is determined to match a predetermined spacing pattern for a phone number, but the meta-data for the selected data field indicates a dollar value an embodiment may determine, based on the most likely scenario, which characteristic to utilize as the identified characteristic. This determination may also be factored in when detecting the desired data field as discussed herein.

An embodiment then, based on the identified characteristic, modifies the user input at 340. The modifying may include removing a character (e.g., grapheme, letter, numerical digit, punctuation mark, whitespace, symbol, etc.) from the user input. For example, if a user input such as a web address (e.g., www.USPTO.gov) was received in the form of handwriting input an OCR engine may interpret the area near the periods as including spaces. This issue may arise for multiple reasons. For example, typical spell-check algorithms will assume a period is the end of a sentence and thus insert an additional space following it. Alternatively, an individual's writing style may leave additional space between words, especially when a user is writing a string of characters that include symbols (e.g., periods) between the characters.

Additionally or alternatively, an embodiment may modify the user input at 340 by adding a character (e.g., grapheme, letter, numerical digit, punctuation mark, whitespace, symbol, etc.) to the user input. For example, a user may enter input associated with a social security number (e.g., 457 55 5462), again in the form of handwriting input. The OCR engine may then properly interpret numerical values and the spacing pattern thereby allowing an embodiment to determine that the input was a social security number. Based on this determination, an embodiment may then insert hyphens in the appropriate locations (e.g., 457-55-5462) in the user's input prior to insertion in to the data field at 350. Alternatively, an embodiment may modify the user input (e.g., remove or add characters) after insertion into the data field.

Accordingly, as illustrated by the example embodiments and figures, an embodiment provides receiving user input (e.g., machine text, handwriting input, etc.). Identifying a characteristic of the received user input. The characteristic may be grammatical structure, spacing patterns, syntax, or meta-data associated with the data field selected for entry. Based on the identified characteristics, the user input is modified by removing particular characters (e.g., white space) to comply with the format of a predetermined data form (e.g., email address, website address, etc.) and inserted into the selected data field or edited after insertion.

The various embodiments described herein thus represent a technical improvement to receiving user input (e.g., ink input, OSK input, etc.). Identifying a characteristic of the received user input associated with at least one of syntax, grammatical structure, spacing patterns, or meta-data associated with the data field selected for entry. Then, based on at least one of these characteristics, modifying the user input by including particular characters (e.g., hyphens, symbols, etc.) to comply with the format of a predetermined data form (e.g., email addresses, phone numbers, etc.). The modified user input is then inserted into the selected data field or edited after insertion.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, on a touch input device, user input for input to a destination within an application, wherein the destination comprises a predetermined syntax structure, wherein identifying the destination for input is at least partially based upon a proximity of the user input provided in real time to one or more data fields within the application, wherein the identifying the destination for input is at least partially based upon an input type of the one or more data fields corresponding to the destination;

determining the user input does not match the predetermined syntax structure of the destination, wherein the determining comprises identifying an input type of the user input by identifying syntax of the user input from characters included in the user input and determining, based upon the input type, that the user input does not match the predetermined syntax structure of the destination;

automatically modifying, without additional user input, the user input to match the predetermined syntax structure of the destination, wherein the modifying comprises replacing at least one character of the user input; and inserting, after the modification, the modified user input into the one of more data fields associated with the destination.

2. The method of claim 1, further comprising: modifying, based on meta-data associated with the one or more data fields, the user input.

3. The method of claim 1, wherein the user input is at least one of: handwriting input and on screen keyboard input.

4. The method of claim 3, further comprising: responsive to receiving handwriting input, performing optical character recognition on the hand writing input.

5. The method of claim 4, further comprising:
determining, based on the optical character recognition, if the handwriting input matches a predetermined syntax;
wherein the identified syntax comprises an address.

6. The method of claim 5, wherein the address is at least one of:
uniform resource locator, email address, physical address, and phone number.

7. The method of claim 4, further comprising:
determining, based on the optical character recognition, if the handwriting input matches a predetermined spacing pattern;
wherein the identified syntax comprises the predetermined spacing pattern.

8. The method of claim 1, wherein the identified syntax comprises a predetermined spacing pattern.

9. The method of claim 1, wherein the modifying comprises removing a character from the user input, the character comprising at least one of: grapheme, letter, numerical digit, punctuation mark, whitespace, and symbol.

10. The method of claim 1, wherein the modifying comprises adding a character to the user input, the character comprising at least one of: grapheme, letter, numerical digit, punctuation mark, whitespace, and symbol.

11. An information handling device, comprising:
a processor;
a touch input device operatively coupled to the processor; and
a memory device that stores instructions executable by the processor to:
receive, on the touch input device, user input for input to a destination within an application, wherein the destination comprises a predetermined syntax structure, wherein identifying the destination is at least partially based upon a proximity of the user input provided in real time to one or more data fields within the application, wherein the identifying the destination for input is at least partially based upon an input type of the one or more data fields corresponding to the destination;
determine the user input does not match the predetermined syntax structure of the destination, wherein the determining comprises identifying an input type of the user input by identifying, using a processor, syntax of the user input, wherein to determine comprises identifying an input type of the user input by identifying syntax of the user input from characters included in the user input and determining, based upon the input type, that the user input does not match the predetermined syntax structure of the destination;
automatically modify, without additional user input, the user input to match the predetermined syntax structure of the destination, wherein the modifying comprises replacing at least one character of the user input; and
insert, after the modification, the modified user input into the one or more data fields associated with the destination.

12. The information handling device of claim 11, further comprising: modifying, based on meta-data associated with the one or more data fields, the user input.

13. The information handling device of claim 11, wherein the user input is at least one of: handwriting input and on screen keyboard input.

14. The information handling device of claim 13, wherein the instructions are further executable by the processor to: responsive to receiving handwriting input, performing, using a processor, optical character recognition on the hand writing input.

15. The information handling device of claim 14, wherein the instructions are further executable by the processor to:
determining, based on the optical character recognition, if the handwriting input matches a predetermined syntax;
wherein the identified syntax comprises an address.

16. The information handling device of claim 15, wherein the address is at least one of: uniform resource locator, email address, physical address, and phone number.

17. The information handling device of claim 14, wherein the instructions are further executable by the processor to:
determine, based on the optical character recognition, if the handwriting input matches a predetermined spacing pattern;
herein the identified syntax comprises the predetermined spacing pattern.

18. The information handling device of claim 11, wherein the modifying comprises removing a character from the user input, the character comprising at least one of: grapheme, letter, numerical digit, punctuation mark, whitespace, and symbol.

19. The information handling device of claim 11, wherein the modifying comprises adding a character to the user input, the character comprising at least one of: grapheme, letter, numerical digit, punctuation mark, whitespace, and symbol.

20. A product, comprising:
a storage device having code stored therewith, the code being executable by a processor and comprising:
code that receives, on a touch input device, user input for input to a destination within an application, wherein the destination comprises a predetermined syntax structure, wherein identifying the destination is at least partially based upon a proximity of the user input provided in real time to one or more data fields within the application, wherein the identifying the destination for input is at least partially based upon an input type of the one or more data fields corresponding to the destination;
code that determines the user input does not match the predetermined syntax structure, wherein the determining comprises identifying an input type of the user input by identifying syntax of the user input from characters included in the user input and determining, based upon the input type, that the user input does not match the predetermined syntax structure;

code that automatically modifies, without additional user input, the user input to match the predetermined syntax structure of the destination, wherein the modifying comprises replacing at least one character of the user input; and code that inserts, after the modification, the modified user input into the one or more data fields associated with the destination.

* * * * *